(12) United States Patent
Martin et al.

(10) Patent No.: US 7,877,084 B2
(45) Date of Patent: Jan. 25, 2011

(54) METHOD AND SYSTEM FOR AUTOMATIC CALL FILTERING BASED ON USER SELECTABLE PARAMETERS

(75) Inventors: Jennifer Martin, Chicago, IL (US); John Nathan Tolva, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 11/612,177

(22) Filed: Dec. 18, 2006

(65) Prior Publication Data

US 2008/0146200 A1 Jun. 19, 2008

(51) Int. Cl.
*H04M 3/42* (2006.01)

(52) U.S. Cl. ............... 455/414.1; 455/95; 455/415; 455/550.1

(58) Field of Classification Search ........... 455/413, 455/414.1, 90.1–90.3, 95, 415, 550.1, 552.1, 455/556.2, 558
See application file for complete search history.

(56) References Cited

U.S. PATENT DOCUMENTS

| | | | |
|---|---|---|---|
| 5,467,388 A | 11/1995 | Redd et al. | |
| 6,397,058 B1 | 5/2002 | Thibert et al. | |
| 6,408,174 B1 * | 6/2002 | Steijer | 455/407 |
| 6,490,449 B1 | 12/2002 | Thibert et al. | |
| 6,526,390 B1 * | 2/2003 | Wang et al. | 705/39 |
| 6,539,217 B1 * | 3/2003 | Syed et al. | 455/406 |
| 6,556,586 B1 * | 4/2003 | Sipila | 370/469 |
| 7,116,769 B2 | 10/2006 | Hama | |
| 7,130,644 B2 | 10/2006 | Kuwahra et al. | |
| 7,136,480 B2 * | 11/2006 | Mason | 379/266.02 |
| 7,395,085 B1 * | 7/2008 | Mauer et al. | 455/552.1 |
| 7,613,445 B1 * | 11/2009 | Stanev | 455/407 |
| 7,627,308 B2 * | 12/2009 | Chang et al. | 455/414.1 |
| 2004/0242229 A1 | 12/2004 | Okazaki | |
| 2005/0008135 A1 * | 1/2005 | Bressler | 379/211.01 |
| 2005/0064854 A1 * | 3/2005 | Jang | 455/415 |
| 2006/0133317 A1 | 6/2006 | Hurtha | |
| 2006/0291641 A1 * | 12/2006 | Barclay et al. | 379/211.03 |
| 2008/0014885 A1 * | 1/2008 | Winkler | 455/187.1 |

FOREIGN PATENT DOCUMENTS

WO  2005/109841 A1  11/2005

\* cited by examiner

*Primary Examiner*—Kamran Afshar
*Assistant Examiner*—Marisol Fahnert
(74) *Attorney, Agent, or Firm*—Schmeiser, Olsen & Watts; William H. Steinberg

(57) ABSTRACT

The present invention provides a method and system that enables telephone users to specify parameters that will be used in filtering incoming calls to the user's telephone device. The invention can use parameters known in telephone use such as call cost or roaming detection of mobile telephone device and user-defined settings to enable users to control costs and improve efficiency when using their cell telephones especially outside their home network and/or time zone. These call filtering parameters serve to activate the call filtering method of the present invention. The user can choose parameters that specify telephone call cost and user time zone location as threshold parameters that can trigger activation of the call filtering method of the present invention. When those parameters are exceeded, the system will enable the user-defined settings that determine how to process or direct incoming calls. The method and system of this invention can include dynamic parameters (i.e. cost) and/or static parameters (i.e. time of day) as triggering parameters. Further, the method of this invention can be automatically activated by triggers or can be manually activated by the user at any time.

20 Claims, 7 Drawing Sheets

| Rule 1 | Send caller to standard or custom voicemail |
| Rule 2 | Send to voicemail with caller options |
| Rule 3 | Option to send SMS message |

White List

723-222-0304
723-222-0000
723-222-1010
...
...
723-222-0011

— 42

Black List

723-222-0304
723-222-0000
723-222-1010
...
...
723-222-0011

— 43

Group 1

METHOD AND SYSTEM FOR AUTOMATIC CALL FILTERING BASED ON USER SELECTABLE PARAMETERS

FIELD OF THE INVENTION

This invention relates to a method and system for automatically filtering incoming telephone calls, and particularly to a method and system for automatically filtering incoming telephone calls based on user selected parameters and still further to a method and system for automatically filtering incoming telephone calls when a user's telephone device is in a roaming state or location.

BACKGROUND OF THE INVENTION

The advances in technology have made today's society a more paperless and wireless society. The emergence of global computer and communication networks enable people to communicate instantly and transmit various types of data through these communication networks. In addition to the advancements in computer and communication networks, the technology that provides for communication via the telephone has also made substantial advances in the past two decades. Historically, a telephone network comprised a telephone connected to a central switching box/location. These switching locations were connected through networks of cables. Many of these communication cables were large lines that contained many small communication wires that carried the telephone information. Today, telephone communications are much more sophisticated than the traditional telephone networks. The basic telephone network having a telephone connected to a switching box does still exist. However, because of the variety of telephones that are in use, today's telephone communication network configurations include the basic telephone network and other communication means and devices.

The use of the telephone in a wireless network configuration has made telephone communication more convenient. Because many people access global communication networks such as the Internet via a telephone, it appears that a logical progression of technology would lead to the development of technologies that incorporate wireless telephone devices as part of global computer and communication networks. As shown in FIG. 1, telephone communication networks incorporate both wireless and physical connection devices. Communication towers 10 and 11 provide the connection means for mobile and wireless devices within this network. Each tower has a defined area in which the tower provides wireless telephone connections. As shown, tower 10 serves mobile devices 12, 13, and 14. Tower 11 serves mobile devices 15 and 16. Within a defined area, the tower will facilitate the connection of wireless devices to the telephone network. This connection will enable a wireless device 16 to connect to other wireless devices or to conventional and stationary devices such as homes, factories and office buildings.

In addition to the improvements in the ability to connect mobile telephone devices, other enhancements to mobile telephone technology in recent years make it easy to travel abroad and use one's mobile cellular telephone. Tri-band and quad-band telephones are becoming the mainstream. By dialing one's local telephone number, callers can reach a particular mobile telephone user wherever that user's telephone has service.

With the enhanced capabilities of mobile telephone technology that enables one to use their mobile telephone almost anywhere, frequent travelers encounter to potential issues: cost and inconvenience. Each time one user receives a call, that user is subject to roaming charges. Not all callers know that the person they are calling is traveling (in a different time zone) and therefore might unknowingly be calling that person in the middle of the night. Currently, the only known solution to the cost issue is to purchase a local sim card. However, this means that callers dialing a local number of a person would no longer be able to reach that person via the local number. There are telephones that accommodate more than one sim card, but that would not address the cost issue for incoming calls.

Roaming indicators exist, but these indicators only alert the user of the telephone before they make a call. In addition, call filtering also exists, however this features simply allows users to create lists of callers to "approve" and "reject". As a last resort, the basic solution the inconvenience issue is for the user to turn their telephone off. However, there are situations when the user requires, needs or wants their telephone to be turned on. "Missed call alert" features exist, but this doesn't address the problem.

There have been other attempts to address issues related to incoming calls and roaming issues. U.S. Pat. No. 6,397,058 to Thibert et al. describes a system and method of controlling the delivery of an incoming call in a radio telecommunications network based on the location of a roaming mobile subscriber. The radio telecommunications network includes a home network, which comprises a Home Location Register (HLR) and a Service Control Point (SCP). The HLR keeps a subscriber profile which includes a termination service trigger, in addition to keeping track of the subscriber's location. The SCP includes a service profile record, which comprises one or more call delivery/termination service options. The service profile record also stores an indication for each group whether an incoming call is to be delivered to the mobile subscriber when roaming in the area or regions covered by the group. A gateway MSC interrogates the home HLR for the subscriber's location when an incoming call is received thereat. The HLR, in turn, depending upon the termination service trigger, queries the SCP for appropriate call delivery options.

U.S. Pat. No. 6,490,449 to Thibert, describes a system and method of providing an intelligent automatic roaming analysis (ARA) that enables a roaming mobile subscriber to use abbreviated dialing regardless of the location of the subscriber in a radio telecommunications network.

U.S. Pat. No. 5,467,388 to Redd et al., describes a system for allowing a telephone subscriber to selectively block incoming calls for selected time periods or during programmed time intervals. A subscriber may pre-program a time interval in minutes, or a time period (start time and end time) for which some or all-incoming calls are to be blocked. The subscriber may assign caller numbers or personal identification numbers to one of a plurality of tiers of access. The subscriber may enable the call blocking system for selected access tiers. An emergency access tier may be provided to insure emergency calls are not blocked by the system.

Although these methods and systems attempt to address issues related call filtering, these approaches do not address issues related to controlling costs and convenience when a person does frequent traveling. In addition, these approaches are general and provide one implementation regardless of the specific needs and desires of a telephone user. There remains a need for a method and system that can enable a telephone user to configure a customized system for call filtering that specifically addresses the specific needs and desires of that telephone user.

SUMMARY OF THE INVENTION

The present invention provides a method and system that enables telephone users to specify parameters that will be used in filtering incoming calls to the user's telephone device. The invention can use parameters known in telephone use such as call cost or roaming detection of mobile telephone devices and user-defined settings to enable users to control costs, improve efficiency and provide convenience when using their cell telephones especially outside their home network and/or time zone and/or working hours. These call filtering parameters serve to activate the call filtering method of the present invention. The user can choose parameters such as those that specify telephone call cost, user time zone location and time of day as threshold parameters that can trigger activation of the call filtering method of the present invention. When those parameters are exceeded, the system will enable the user-defined settings that determine how to process incoming calls. For example, the user could define a setting that specifies that incoming calls go immediately to voicemail where the caller would hear a customized message telling the caller that the user is traveling, and currently in a time zone 8 hours later than their normal time. The system could then instruct callers to press 1 to continue to place the call or press 2 to leave a message. The user could also specify 'white list' numbers that always bypass processing rules. The user could also specify rules for processing of other types of incoming messages such as text or multimedia.

In the method of the present invention, the user configures parameters to be used as triggers to activate the call filtering process. As mentioned, these parameters can be such things as call cost or location (roaming) of the user. Next the user configures different criteria that determine how to treat an incoming call once the call filtering has been activated by the trigger of the parameters.

The present invention provides a method and system that uses dynamic parameters (i.e. time zone and call cost) as well as other parameters such as time of day to enable a user to customize their own call filtering system. In addition, the present invention can be used for mobile or stationary calling devices. Further, the present system can be automatically or manually activated. With manual activation, the user can activate the system at any time using their own telephone or by accessing a website.

DESCRIPTION OF THE DRAWINGS

FIG. 4b is an illustration of various telephone lists created in accordance with the implementation of the setup and configuration method of the present invention.

DETAILED DESCRIPTION OF THE INVENTION

The present invention provides a method and system that enables telephone users to specify parameters that will be used in filtering incoming calls to the user's telephone device. Although this method and system can apply in any setting where a telephone receives incoming calls, the description of the invention herein will be in the context of the user of a mobile telephone device and addressing issues related specially related to mobile telephone use.

Figure 1:
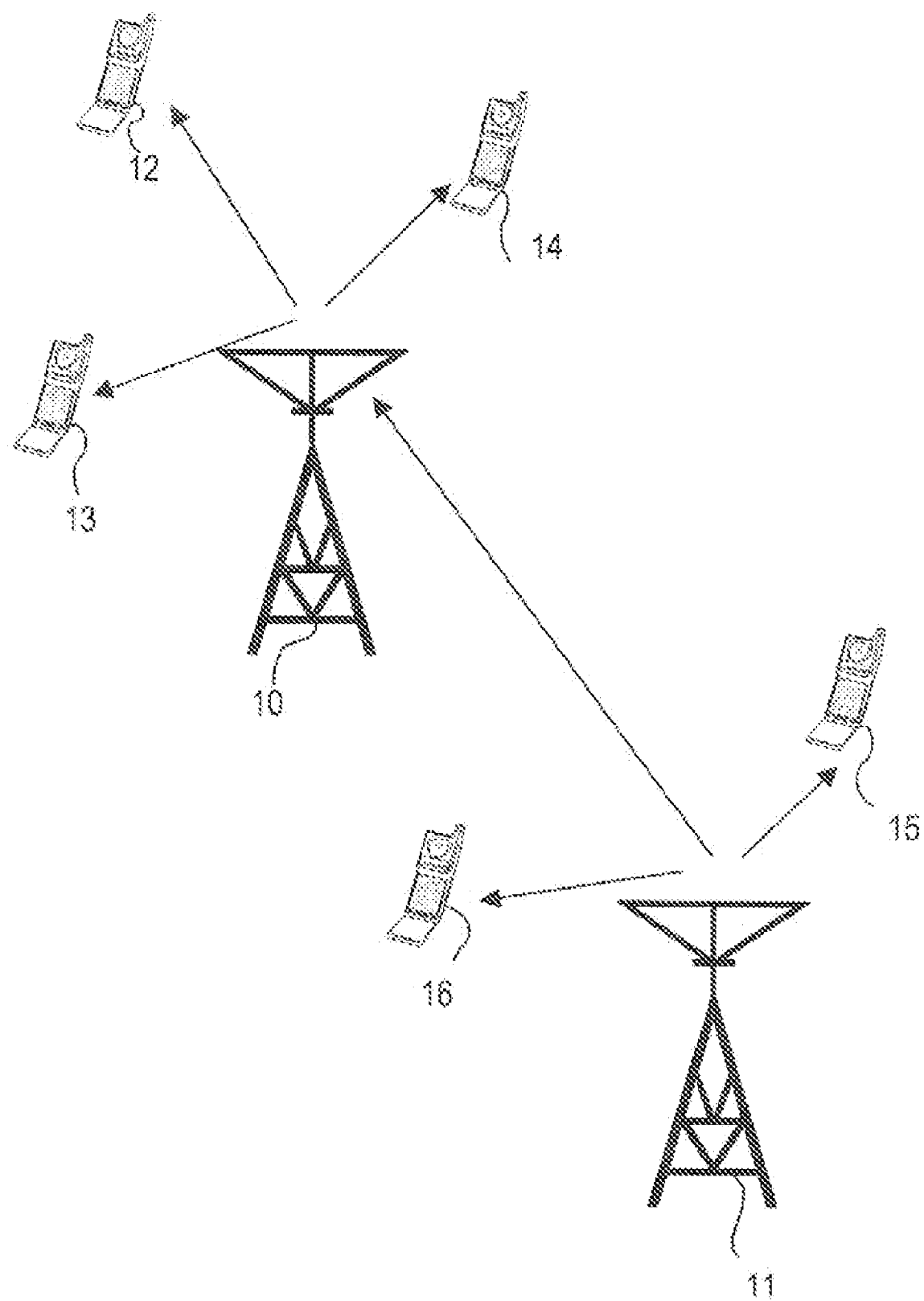
FIG. 1 illustrates a conventional telephone communication network that services both wireless and physical connection devices.
Figure 2:
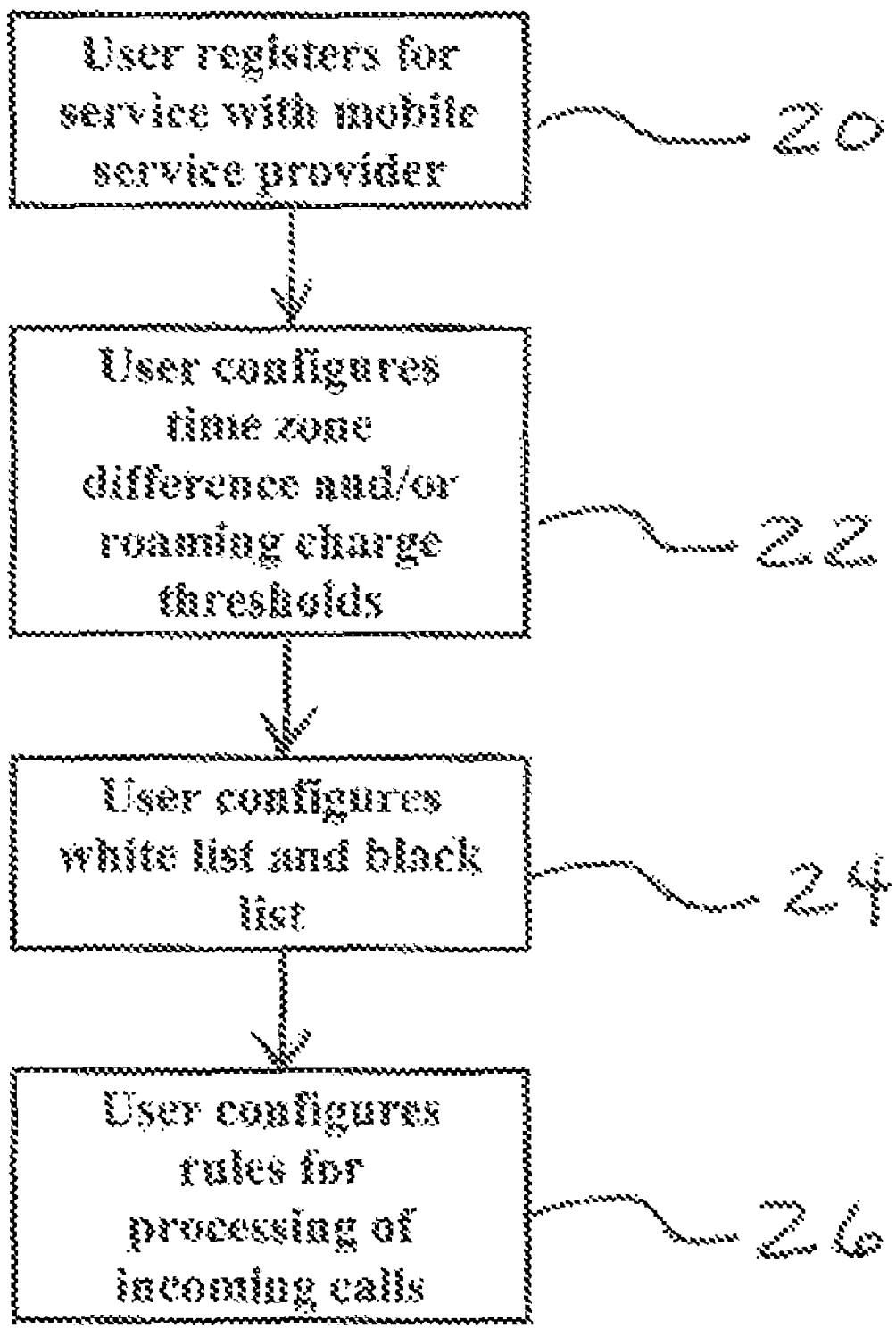
FIG. 2 illustrates a flow diagram of the steps in the setup and configuration process of the call filtering process of the present invention.

The present invention would operate as part of the mobile telephone service provider's telecommunications network. It would be an opt-in end-user service. Referring to FIG. 2, shown are the steps for the setup and configuration of the call filtering process of the present invention. This setup process creates a user profile for a user. This user profile is associated with a particular telephone number. In step 20, the user registers for this call filtering with the mobile service provider. This process is similar to signing up for other optional telephone features such 'call waiting' or 'call forwarding'. After registering for the service, users would configure how incoming calls are processes either through a web or telephone interface. In step 22, the user then specifies or defines different parameters that will serve as triggers to activate the call filtering process of the present invention. As part of the parameter specification, the user defines threshold values of the parameters that will trigger the activation of the call filtering method of the present invention. For example, the user can specify when the service would be activated by choosing a threshold time zone offset (i.e., "Activate service when I am more than 3 hours away from my home time zone") and/or by choosing a threshold cost differential (i.e., "Activate service when the cost of an incoming call is $2.00 or more than my non-roaming rate"). In step 24, the user can create lists containing known telephone numbers. Depending on the user's preferences, theses lists can vary. For example, the user may create a 'white list' that allows the call to go through regardless of any designed parameters that may currently be present. In addition, the user could create a 'black list' that always automatically sends a caller on this list to a voicemail location.

In the next step 26, the user specifies the rules for handling incoming calls. These rules could be similar to the below list example rules.

The user can define a 'white list' of callers that are never impacted by the roaming call processing service.

The user can define a 'black list' of callers that are never put through when the roaming call processing service is invoked.

The user can create rule sets and apply them to groups of contacts, and define a rule for "all other callers". For example:
1. The user can send calls to a default voicemail message or a custom voicemail message that explains that the person you are calling is traveling and not accepting calls at the present time.
2. The user can send calls to a default voicemail message or a custom voicemail message that gives callers the option to 1) continue with the call, 2) leave voice mail, 3) send an SMS.

The user can define whether message alerts are processed immediately or are batched for delivery at user-determined time.

The user can specify the same options for other types of messages such as SMS and MMS With regard to a roaming criterion, the user can set hours of activation relative to their current time zone (i.e., thresholds are only activated during the hours of 10 pm and 6 am locally). In addition the user can use information about the time zone of the originator to exempt local calls from the roaming call processing service (i.e., if one is in Beijing and they receive a call from someone in Beijing, the roaming call processing rules would not apply).

Figure 3:
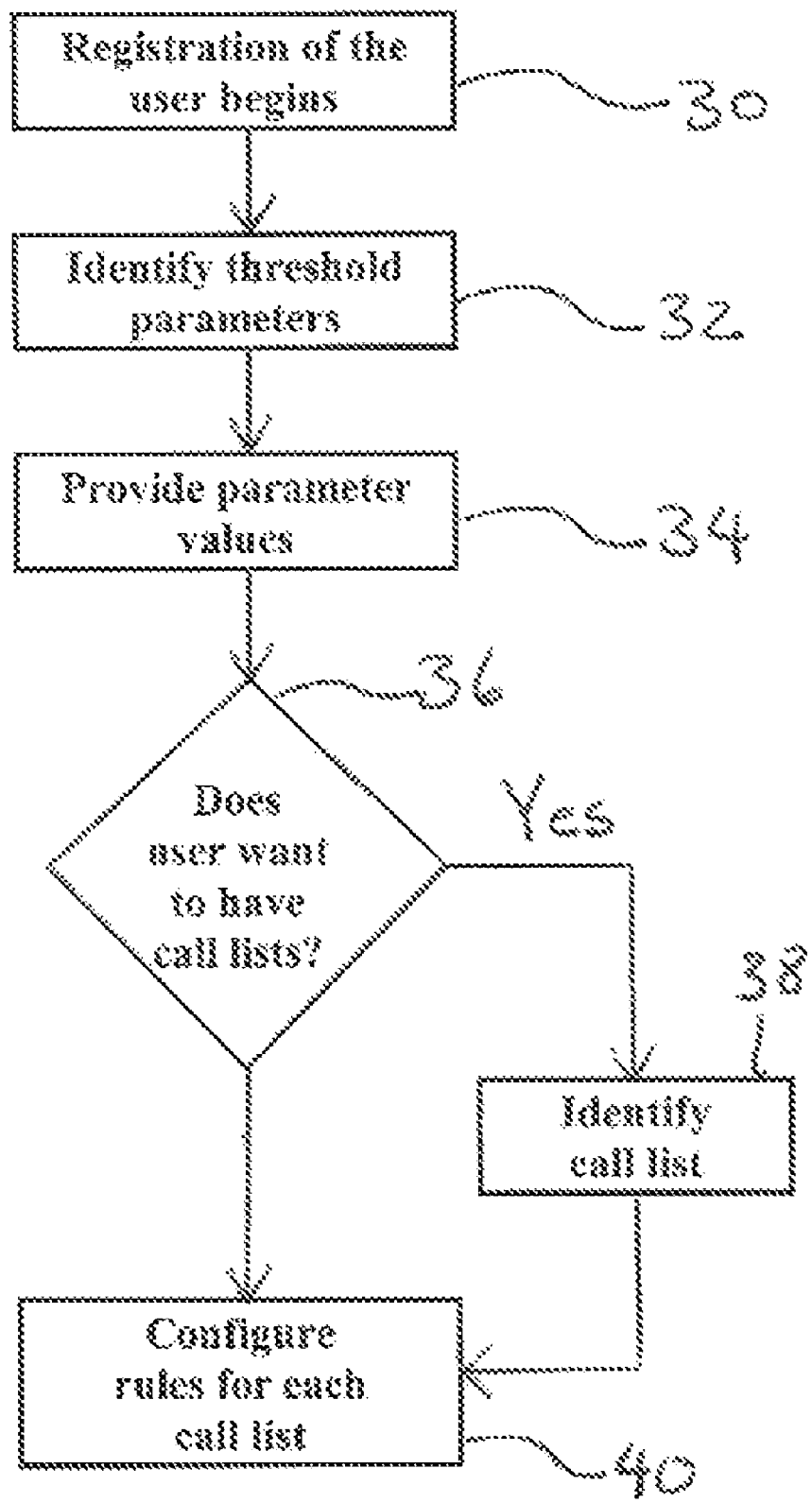
FIG. 3 is a flow diagram of a detailed implementation of the setup and configuration process of the call filtering process of the present invention.
Figures 4A, 4C:
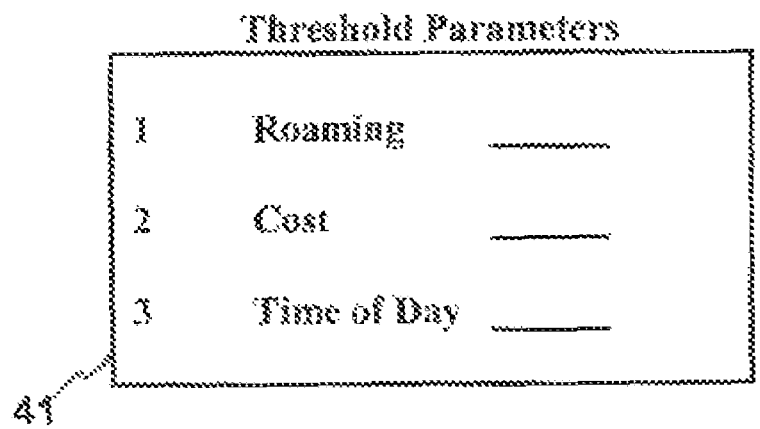
FIG. 4a is an illustration of a menu driven method for selection of enablement triggering parameters.
FIG. 4c is an illustration of a menu driven process for selection of rules for application to incoming telephone calls in the method of the present invention.

FIG. 3 shows a more detailed implementation of the method of the present invention. As with the method of FIG. 2, step 30 begins the user registration process for use of the call filtering system. In step 32, the user will identify threshold parameters that will be used during the monitoring mode to trigger the enablement or activation of the call filtering method. Referring to FIG. 4a, this parameter identification can be menu driven using predetermined parameters 41. As shown, in this example, parameter 1 is a roaming parameter that is associated with distance. The system can detect when a user has left the local calling area for a defined telephone service. This parameter can have a threshold criterion of time zones. Once the user leaves their base time zone, it is detected to activate the call filtering system. With this parameter, there can be situations where the user leaves a local service area, but remains in the same time zone. If the user selects this parameter, the system can automatically detect when the user leaves their local time zone. Another parameter can be cost. This parameter can be identified in the menu as parameter 2. With this parameter, the user can specify the activation of the method if the cost of an incoming call would exceed a specified dollar amount in step 34. Unlike the roaming parameter and because different users may have different requirements, this parameter would require the user to enter a threshold dollar amount. A third parameter could be time of day. A user who is not traveling, may still not want calls during certain time interval (such as 10 pm to 7 am). When selecting this parameter, the user would enter the time interval in step 34. A user could select each parameter if desired.

Referring back to FIG. 3, after identification of the threshold parameters in step 32 and the specification of parameter values step 34, the next step is to determine in step 36 whether the user wants to have specified telephone lists that categorized incoming calls. If the user does want these call lists, the method moves to step 38 where the user is prompted to enter telephone numbers in the various types of lists.

Referring to FIG. 4b, there can be several call lists including the 'white list' 42 in which the numbers in this list always go through regardless of the activation of the call filtering system. The 'black list' 43 contains numbers that always go directly into voicemail. These 'black list' numbers never go through when the call filtering system is active. A third list 44 can a group of numbers for which defined rules will apply. The final group can be any number not identified in any of the other specified lists. Defined rules will also apply to numbers in this list.

Referring again to FIG. 3, if in step 36, there are no specified lists, the process moves to step 40 to construct rules that will govern the calls. When there are no telephone lists, there may be just one rule, which could be to send all calls to voice mail. Regardless of the determination in step 36, step 40 will be performed. This step will usually follow step 38 and will be based on the list created in step 38. FIG. 4c shows predetermined rules 47 that can be selected in a menu-driven process. Rule 1 can be to send a custom or standard voice mail. Rule 2 can be to send voice mail with caller options. Rule 3 could give the caller an option to send a text message. Once the identified rules are selected or constructed, the system is ready for activation.

With regard to the implementation of the invention, from a networking perspective, the system is enabled when a customer's telephone is registered on a non-local network. In addition, the user can also enable the system at any time. Home providers know when a customer is roaming on an international (or other) network; this is how GSM roaming and cross-billing to partner carriers works. Once registered off-network the activation thresholds are evaluated. If the criteria are met, then the service begins and calls are blocked, filtered, or otherwise processed per the settings of the user. A message is sent to the customer alerting that the service has been activated. The service can be shut off or paused at any point via the customer telephone or online.

Figure 5:
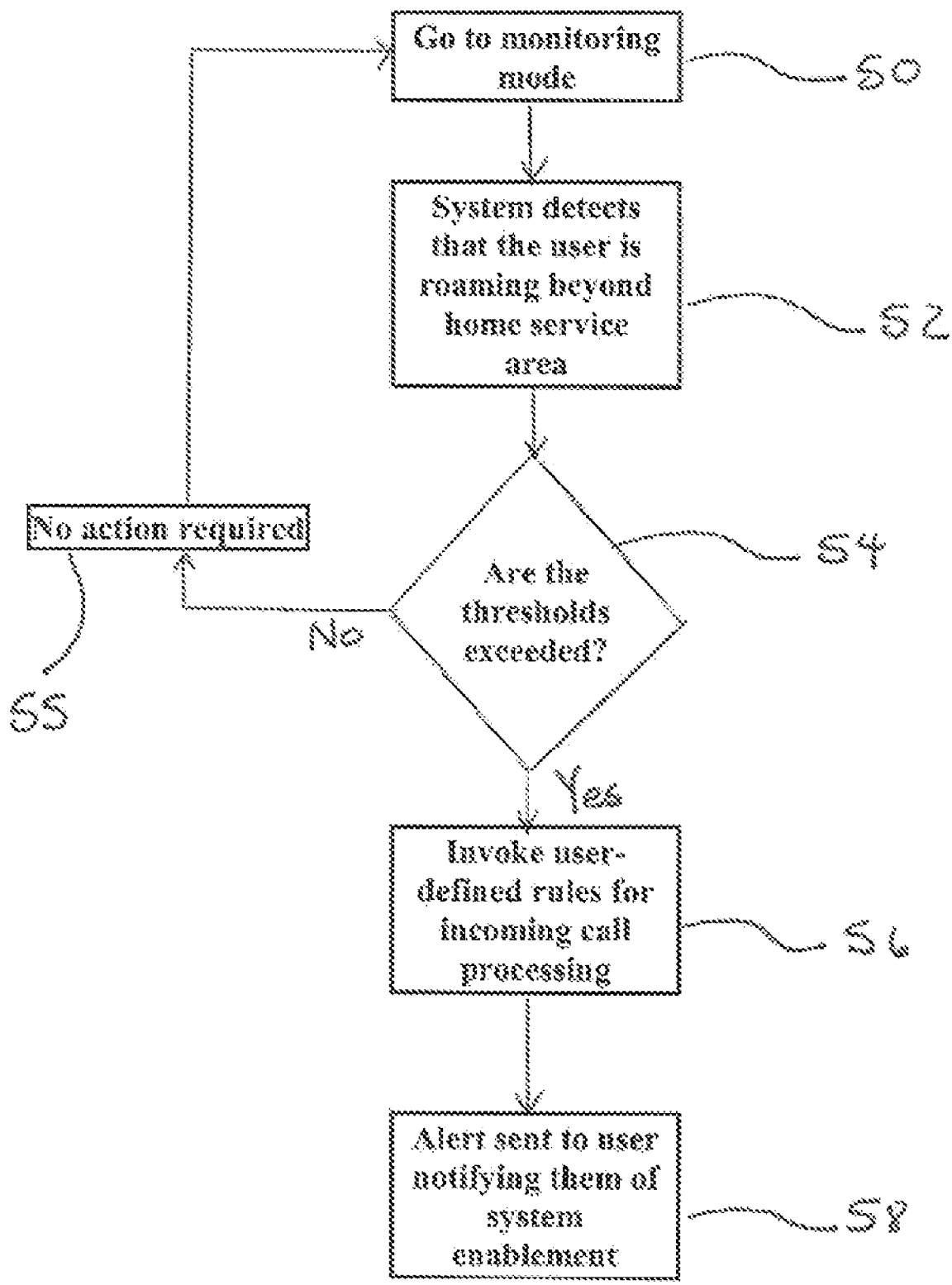
FIG. 5 illustrates a flow diagram of the steps in the enablement of the call filtering process.

FIG. 5 illustrates a flow diagram of the steps in the enablement of the call filtering process. Once the user has registered with the telephone service provider, in step 50, the call-filtering feature of the present invention goes into a monitoring mode. During the monitoring mode, in step 52, the system detects that the user is roaming beyond the home service area. This detection can be accomplished through techniques that the currently detect roaming. At this point, step 54 determines whether the distance threshold is exceeded. If the determination is that this detection does not trigger an enablement, the process moves to moves to block 55, which then returns to the monitoring mode. Referring to the determination step 34, if the detection does trigger an enablement, the method moves to step 56, which invokes user-defined rules for filtering and processing incoming calls. In addition, step 58 sends an alert to the user notifying the user of the system enablement. With reference to distance, for example a caller can be roaming but still be within the local time zone. In this case, the user may want to enable the call-filtering system.

Figure 6:
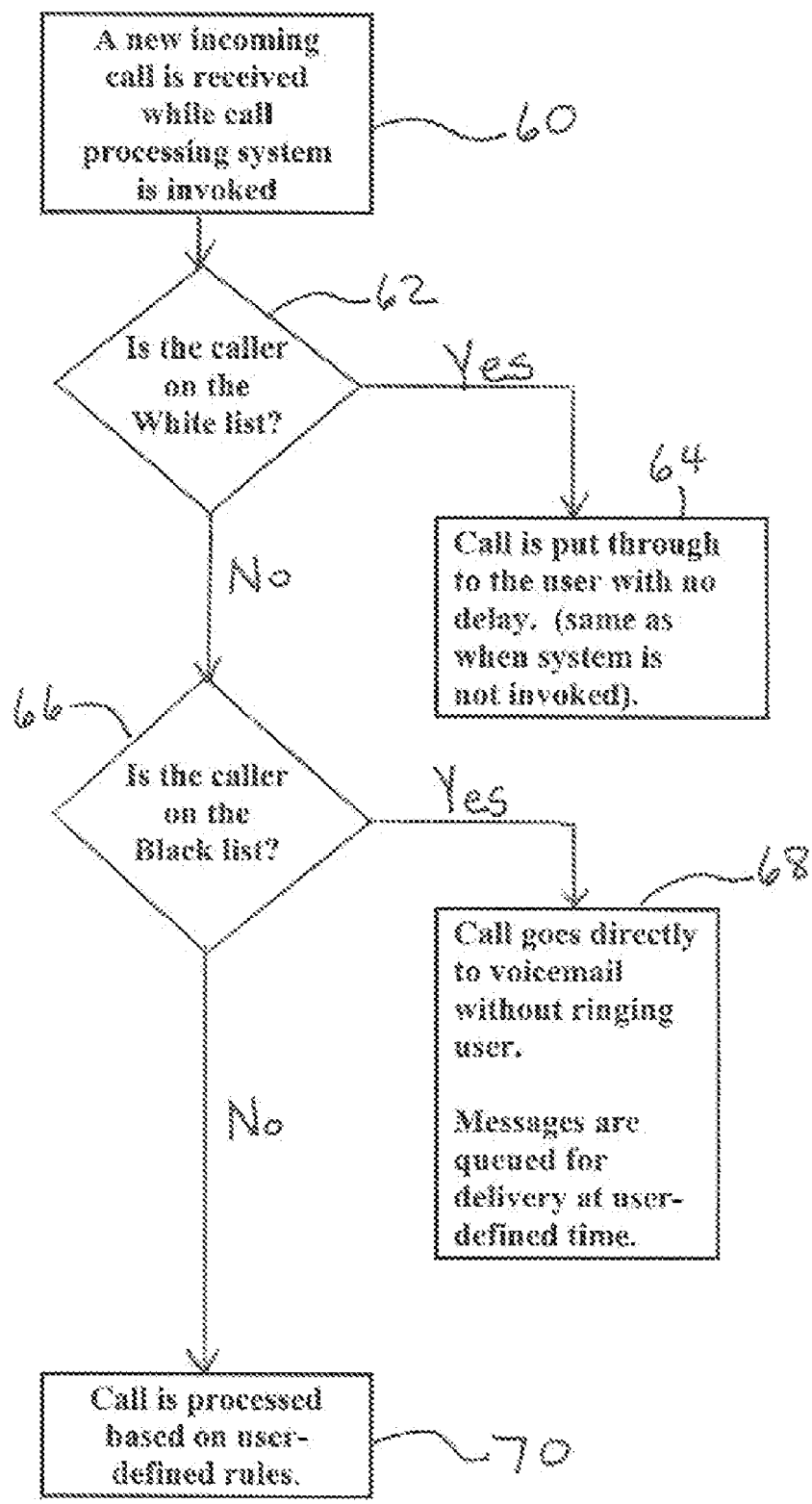
FIG. 6 illustrates a flow diagram of the steps in the process for handling an incoming telephone call while the system of FIG. 3 is enabled.

When a detected activity does trigger an action in step 56, the process moves to the routine for handling incoming calls. FIG. 6 illustrates a flow diagram of the steps in the process for handling an incoming telephone call while the system of FIG. 5 is enabled. In step 60, the new incoming call is received while the call processing system is invoked. At this point, there can be first a determination in step 62 of whether the incoming call is on the 'white list'. If the caller is on the 'white list', the process moves to step 64 where the call is put through to the user with no delay (same as when the system is not invoked). If in step 62, the determination is that the caller is not on the 'white list', the process moves to step 66 where there is determination of whether the caller is on a 'black list'. If the determination is that the caller is on the 'black list', then the call goes directly to voicemail without ringing the user's telephone in step 68. The messages are queued for delivery to the user at a defined time. Returning to step 66, if the determination is that the caller is not on the 'black list', then the process moves to step 70 where the call is processed using defined rules for calls that are not on either the 'white list' or the 'black list'. These rules were defined in step 26 of the user setup routine.

It is important to note that while the present invention has been described in the context of a fully functioning data processing system, those skilled in the art will appreciate that the processes of the present invention are capable of being distributed in the foam of instructions in a computer readable medium. Examples of computer readable media include media such as EPROM, ROM, tape, paper, floppy disc, hard disk drive, RAM, and CD-ROMs.

We claim:

1. A method for automatic call filtering based on user selectable parameters, said method comprising:

receiving from a user a call processing rule for processing an incoming call directed to a mobile telephone of the user; wherein call processing rule comprises a first call processing rule or a second call processing rule, wherein the first call processing rule comprises not accepting the incoming call and sending a first voicemail message to a caller that sent the incoming call explaining why the incoming call is not being accepted, and wherein the second call processing rule comprises sending to the caller a second voicemail message that gives the caller an option of (i) continuing with the incoming call, (ii) leaving a voice mail for the user, or (iii) sending a Short Message Service (SMS) to the user;

receiving from the user a call-filtering rule which if satisfied with respect to the incoming call triggers execution of the call processing rule, wherein the call filtering rule relates to a location of the mobile telephone when the incoming call is received or to a cost of the incoming call;

after said receiving from the user the call processing rule and the call-filtering rule, receiving the incoming call directed to the mobile telephone of the user;

in response to said receiving the incoming call, ascertaining that the call-filtering rule is satisfied with respect to the incoming call;

in response to said ascertaining that the call-filtering rule is satisfied with respect to the incoming call, sending an alert to the user informing the user that the call-filtering rule has been satisfied with respect to the incoming call and that execution of the call processing rule in response to said ascertaining has been triggered by said ascertaining;

executing the call processing rule, said executing the call processing rule being performed in response to and triggered by said ascertaining that the call-filtering rule is satisfied with respect to the incoming call.

2. The method of claim 1, wherein the call filtering rule relates to the location of the mobile telephone when the incoming call is received.

3. The method of claim 2, wherein said ascertaining that the call-filtering rule is satisfied comprises ascertaining that the mobile telephone is located more than a specified number of hours away from a home time zone of the mobile telephone when the incoming call is received.

4. The method of claim 2, wherein said ascertaining that the call-filtering rule is satisfied comprises ascertaining that the incoming call is during specified hours in a local area in which the mobile telephone is located when the incoming call is received.

5. The method of claim 2, wherein said ascertaining that the call-filtering rule is satisfied comprises ascertaining that the incoming call does not originate from a time zone in which the mobile telephone is located when the incoming call is received.

6. The method of claim 2, wherein said ascertaining that the call-filtering rule is satisfied comprises ascertaining that the mobile telephone is located outside of a base time zone of the mobile telephone when the incoming call is received.

7. The method of claim 1, wherein the call filtering rule relates to the cost of the incoming call.

8. The method of claim 7, wherein said ascertaining that the call-filtering rule is satisfied comprises ascertaining that the cost of the incoming call exceeds a non-roaming cost for the mobile telephone by at least a specified dollar amount.

9. The method of claim 7, wherein said ascertaining that the call-filtering rule is satisfied comprises ascertaining that the cost of the incoming call exceeds a specified dollar amount.

10. The method of claim 1, wherein the call processing rule comprises the second call processing rule.

11. A computer program product, comprising a computer readable storage medium having computer readable instructions stored therein, said instructions configured to be executed by a communication device to implement a method for automatic call filtering based on user selectable parameters, said method comprising:

receiving from a user a call processing rule for processing an incoming call directed to a mobile telephone of the user; wherein call processing rule comprises a first call processing rule or a second call processing rule, wherein the first call processing rule comprises not accepting the incoming call and sending a first voicemail message to a caller that sent the incoming call explaining why the incoming call is not being accepted, and wherein the second call processing rule comprises sending to the caller a second voicemail message that gives the caller an option of (i) continuing with the incoming call, (ii) leaving a voice mail for the user, or (iii) sending a Short Message Service (SMS) to the user;

receiving from the user a call-filtering rule which if satisfied with respect to the incoming call triggers execution of the call processing rule, wherein the call filtering rule relates to a location of the mobile telephone when the incoming call is received or to a cost of the incoming call;

after said receiving from the user the call processing rule and the call-filtering rule, receiving the incoming call directed to the mobile telephone of the user;

in response to said receiving the incoming call, ascertaining that the call-filtering rule is satisfied with respect to the incoming call;

in response to said ascertaining that the call-filtering rule is satisfied with respect to the incoming call, sending an alert to the user informing the user that the call-filtering rule has been satisfied with respect to the incoming call and that execution of the call processing rule in response to said ascertaining has been triggered by said ascertaining;

executing the call processing rule, said executing the call processing rule being performed in response to and triggered by said ascertaining that the call-filtering rule is satisfied with respect to the incoming call.

12. The computer program product of claim 11, wherein the call filtering rule relates to the location of the mobile telephone when the incoming call is received.

13. The computer program product of claim 12, wherein said ascertaining that the call-filtering rule is satisfied comprises ascertaining that the mobile telephone is located more than a specified number of hours away from a home time zone of the mobile telephone when the incoming call is received.

14. The computer program product of claim 12, wherein said ascertaining that the call-filtering rule is satisfied comprises ascertaining that the incoming call is during specified hours in a local area in which the mobile telephone is located when the incoming call is received.

15. The computer program product of claim 12, wherein said ascertaining that the call-filtering rule is satisfied comprises ascertaining that the incoming call does not originate from a time zone in which the mobile telephone is located when the incoming call is received.

16. The computer program product of claim 12, wherein said ascertaining that the call-filtering rule is satisfied comprises ascertaining that the mobile telephone is located outside of a base time zone of the mobile telephone when the incoming call is received.

17. The method of claim 11, wherein the call filtering rule relates to the cost of the incoming call.

18. The computer program product of claim 17, wherein said ascertaining that the call-filtering rule is satisfied comprises ascertaining that the cost of the incoming call exceeds a non-roaming cost for the mobile telephone by at least a specified dollar amount.

19. The computer program product of claim 17, wherein said ascertaining that the call-filtering rule is satisfied comprises ascertaining that the cost of the incoming call exceeds a specified dollar amount.

20. The computer program product of claim 11, wherein the call processing rule comprises the second call processing rule.

* * * * *